United States Patent [19]

Schnabel

[11] 4,079,503

[45] Mar. 21, 1978

[54] PROCESS FOR THE PRODUCTION OF A SOLID ELECTROLYTIC CAPACITOR

[75] Inventor: Werner Schnabel, Nattheim, Germany

[73] Assignee: Siemens Aktiengesellschaft, Berlin & Munich, Germany

[21] Appl. No.: 700,532

[22] Filed: Jun. 28, 1976

[30] Foreign Application Priority Data

Jul. 23, 1975 Germany .............................. 2532971

[51] Int. Cl.² .............................................. B01J 17/00
[52] U.S. Cl. ......................................... 29/570; 29/585
[58] Field of Search .................. 29/570, 586, 585, 584

[56] References Cited

U.S. PATENT DOCUMENTS

| 3,653,119 | 4/1972 | Fresia | 29/570 |
| 3,970,903 | 7/1976 | Shirn | 29/570 |

Primary Examiner—W. Tupman

Attorney, Agent, or Firm—Hill, Gross, Simpson, Van Santen, Steadman, Chiara & Simpson

[57] ABSTRACT

A method of producing a solid electrolytic capacitor including the steps of producing a sintered anode on a capacitor body which anode has a dielectrically effective oxide coating, producing the capacitor cathode by immersing the capacitor in a bath containing a pyrolytically decomposable compound of the element needed for production of the cathode, and while still in the immersion bath, applying a given voltage to the capacitor body, then lowering the voltage to a further value, removing the capacitor body and producing the cathode by pyrolytic decomposition. A graphite layer is then applied in a known manner and an additional coating is produced by further immersing the capacitor body in another bath which contains a pyrolytically decomposable compound of the element needed for that additional coating. A voltage is also applied in the additional bath and after a lapse of time the capacitor is removed and finished in a known manner.

23 Claims, 4 Drawing Figures

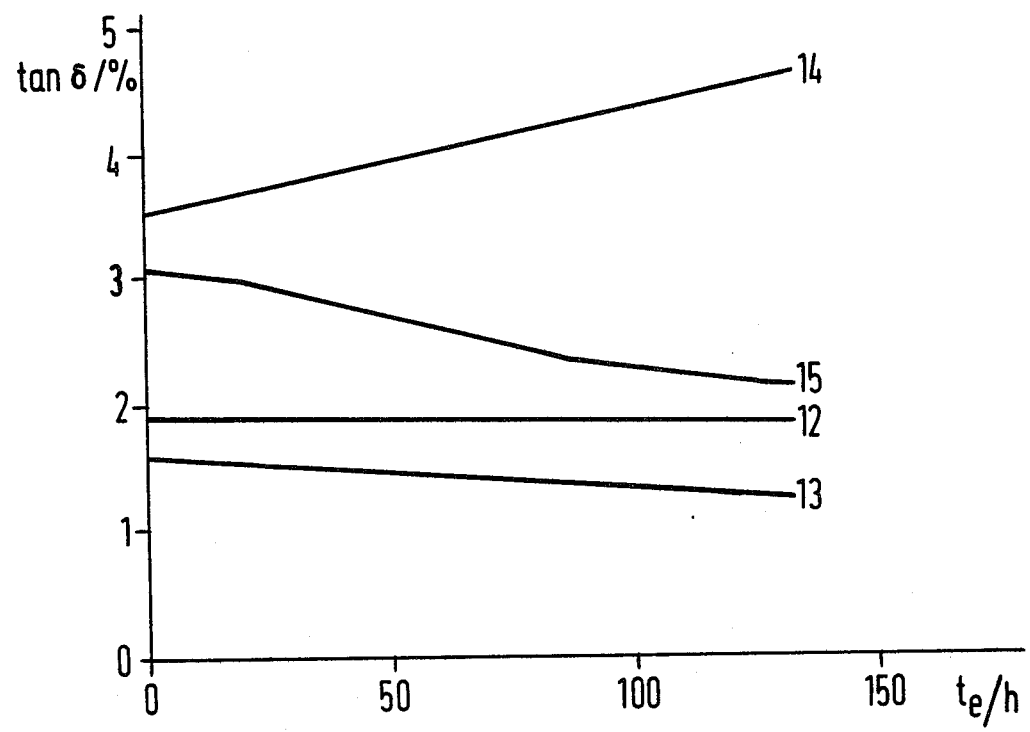

PROCESS FOR THE PRODUCTION OF A SOLID ELECTROLYTIC CAPACITOR

BACKGROUND OF THE INVENTION

1. Description of the Prior Art

Capacitors of the type described herein have heretofore been produced by a process which includes immersing the capacitor body in a bath of, for instance, manganese nitrate the subsequent pyrolytic decomposition. In order to obtain a good cathode coating, these steps must be repeated several times depending upon the size of the anodes and the concentration of the immersion solution. In prior methods, the immersion-pyrolysis stages have been required to be interrupted by intermediate forming stages which have been proven to be necessary to eliminate any faults in the dielectrically effective oxide coating during pyrolysis. These interruptions may be carried out, for example, after every third immersion and after the last immersion and pyrolysis stage. After the intermediate forming process, the capacitor body is required to be dried. This drying step is preceded by a fairly lengthy rinse in distilled water when a non-volatile intermediate forming electrolyte is used. The present invention provides a means for eliminating these intermediate, expensive steps.

2. Field of the Invention

The field of art to which this invention pertains is methods for producing cathodes and additional layers in connection with the production of tantalum capacitors.

SUMMARY OF THE INVENTION

It is an important feature of the present invention to provide an improved solid electrolytic capacitor.

It is another feature of the present invention to provide a solid electrolytic capacitor of the type having a sintered anode made of a film-forming metal and having a cathode made of a semi-conductive metallic oxide.

Another object of the present invention is to provide a capacitor as described above which reduces the time required for producing the capacitor.

Still another object of the invention is to provide a capacitor as described above which eliminates intermediate forming steps which otherwise interrupt the immersion through pyrolysis stages of producing such a capacitor.

It is a specific object of the present invention to provide a method of producing the capacitor described above wherein after the capacitor is immersed in a solution containing a decomposable compound of the element needed for production of the cathode, a given voltage is applied to the capacitor body which after a period of time is reduced to a lower value and subsequently the capacitor is removed and the cathode is produced by pyrolytic decomposition.

It is a further object of the present invention to provide a capacitor as described above wherein an additional coating is produced in a manner similar to the producing of the cathode.

These and other objects, features and advantages of the present invention will be understood from the following description and associated drawings wherein reference numerals are utilized to designate a preferred embodiment.

BRIEF DESCRIPTION OF THE DRAWINGS

FIG. 4 is a graph showing the effect of the aging time on the dissipation factor.

DESCRIPTION OF THE PREFERRED EMBODIMENTS

Figure 1:
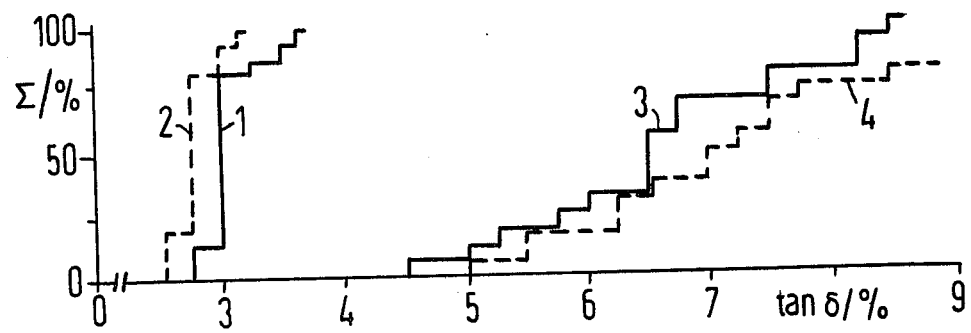
FIG. 1 is a graph showing the cumulative frequency of the dissipation factor.

A solid electrolytic capacitor which consists of a sintered anode made of a film-forming metal, in particular tantalum, and provided with a dielectrically effective oxide coating is shown in copending U.S. patent application, Ser. No. 664,264 filed Mar. 5, 1976. This capacitor has a cathode made of a semi-conducting metallic oxide, in particular manganese dioxide. A graphite coating is provided with a current carrying solderable metallic coating, in particular silver, and has an additional coating of a semi-conductive metallic oxide disposed on the parts of the cathode not covered by graphite particles including spaces between the graphite particles.

The present invention relates to a simple process for producing a capacitor which is economic and which also provides desired electrical properties such as desired impedance, loss factor and leakage current with relatively low variation in these values within a given batch.

In the invention, after the sintered anode has been provided with a dielectrically effective oxide coating in a known manner, the cathode is produced on the capacitor body by first immersing the capacitor body in a bath containing a pyrolytically decomposable compound of the element needed for production of the cathode. After immersion, a voltage $U_{T1}$ is applied to the capacitor body, and after a time $t_1$, the voltage is lowered to a value $U_{P1}$, whereupon the capacitor body is then removed from the bath and the cathode is produced by pyrolytic decomposition. Next, the graphite layer is applied in a known manner. The additional coating is then produced by immersing the capacitor body in a bath containing a pyrolytically decomposable compound of the element needed for production of the additional coating. After immersion, a voltage $U_{T2}$ is applied to the capacitor, and after a time lapse, $t_2$, the capacitor body is removed from the bath, and the additional coating is made by pyrolytic decomposition. Finally, the solid electrolytic capacitor is finished in a known manner.

The processes normally used heretofore for coating tantalum capacitors, i.e., the production of a solid tantalum electrolytic capacitor, provide for the cathodic manganese dioxide coating to be produced on the tantalum sintered anodes with the dielectrically effective oxide coating by immersion in a bath of manganese nitrate and subsequent pyrolytic decomposition. In order to obtain a good cathodic coating, these two process stages have to be repeated several times. The number of immersions depends both on the size of the anodes and on the concentration of the immersion solutions used. The immersion-pyrolysis stages are interrupted by intermediate forming processes designed to eliminate any faults produced in the dielectrically effective oxide coating during pyrolysis. These intermediate forming processes are carried out for example after every third and after the last immersion-pyrolysis stage.

After the intermediate forming process the capacitor body is required to be dried, which step is preceded by a lengthy rinse in distilled water when a non-volative intermediate forming electrolyte is used. Then the manganese dioxide coating is graphited. Next a solderable silver lacquer conductive coating is applied over the graphite layer.

The present invention provides a means for eliminating the separate intermediate forming processes and the associated drying times.

To produce the cathodic manganese dioxide coating the capacitor bodies are immersed in a manganese nitrate bath acidified with nitric acid (pH value equal to or less than 1). On each immersion in the solution of manganese nitrate, the capacitor bodies are simultaneously subjected to a forming process. Immediately after the anodes are immersed, a voltage source, applied to the capacitor, is increased at a specific rate in the region of 0.1 to 10 V/s, in particular 1 V/s, to a given value $U_{T1}$. Shortly before the anode is removed from the bath, after the time $t_1$ ($t_1 = 1$ to 6 minutes, in particular 3.5 minutes) the voltage of $U_{T1}$ is lowered to a new value $U_{P1}$ (rate of decline 1 to 100 V/s, in particular 10 V/s). With the electrical charge associated with $U_{P1}$, the anodes then pass into the pyrolysis oven for thermal decomposition of the manganese nitrate into $MnO_2$. This immersion, forming and pyrolysis, operation is repeated several times until a complete $MnO_2$ coating is obtained. The number of repetitions depends on the size of the anode and the manganese concentration of the immersion solutions employed.

After the last pyrolysis operation, the anodes are graphited. Since the semi-conducting additional coating is produced next, brief drying of the graphited coating is sufficient.

Then the additional coating is applied, for which purpose the capacitor body is immersed in a bath, and the additional coating is then produced by pyrolytic decomposition. Both the immersion in the bath and the subsequent pyrolytic decomposition (at about 250° C) take place in a similar manner to the production of the $MnO_2$ coating with voltages $U_{T2}$ and $U_{P2}$ being applied, these being preferably lower than or equal to $U_{T1}$ and $U_{P1}$.

The values for $U_{T1}$ and $U_{P1}$ depend upon the rated voltage $U_N$ or the anodizing voltage $U_F$ (normally $U_F$ is approximately 4 $U_N$). In the table, the preferred voltage ranges are shown for $U_{T1}$, $U_{T2}$, $U_{P1}$ and $U_{P2}$ in relation to the rated voltage $U_N$.

| $U_N/V$ | $U_{T1}/V$ $U_{T2}/V$ | $U_{P1}/V$ $U_{P2}/V$ |
|---|---|---|
| 6.3 | 15....20 | 8 ....12 |
| 10 | 21....28 | 10....15 |
| 16 | 28....37 | 14....22 |
| 20 | 33....43 | 16....25 |
| 25 | 38....50 | 20....30 |
| 35 | 47....61 | 25....40 |
| 40 | 50....65 | 27....52 |
| 50 | 60....75 | 30....50 |

The bath for producing the additional coating preferably contains the compounds indicated in co-pending U.S. patent application, Ser. No. 664,264 filed Mar. 5, 1976. After the additional coating has been made a further solderable silver lacquer conducting coating is applied.

The essential advantage of the process in accordance with the invention over the known processes is the reduced coating time. The process in accordance with the invention is suitable for automated and controlled coating of solid electrolytic capacitors as all the process stages up to the application of the silver lacquer conductor can be carried out one after another, e.g. in a four-minute cycle.

EMBODIMENT 1

Tantalum solid electrolytic capacitors having the rated value 33 $\mu F/6V$ were produced using a process in accordance with the invention. The additional coating was made of bismuth oxide and produced by immersing the capacitor body in an acid (pH about 0.3) 0.5 M bismuth nitrate bath.

Figure 2:
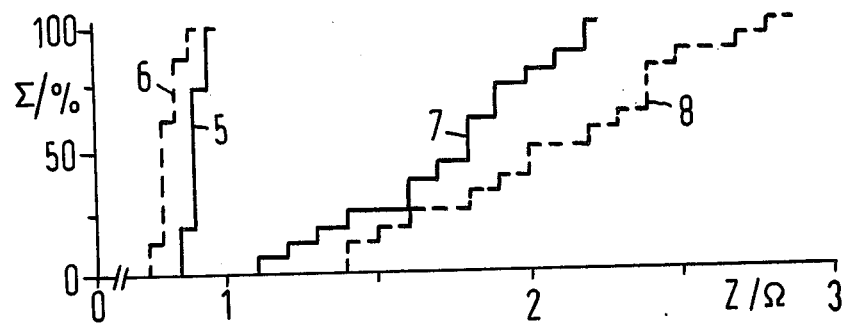
FIG. 2 is a graph showing the cumulative frequency of the impedance.

FIG. 1 shows the cumulative frequency $\Sigma$ of the dissipation factor $tan\delta$ (120 Hz, 25° C) and FIG. 2 shows the cumulative frequency of the impedance Z (10kHz, 25° C). In both figures, these electrical values are shown before and after aging (125° C, 9V, 14 hours).

For comparison, both figures show the values for capacitors that have been made using the same process but without any additional bismuth oxide coating. In FIG. 1, the line graph 1 shows the dissipation factor before the line graph 2 and the dissipation factor after the aging process. Line graph 3 shows the results for comparison capacitors without the additional coating and before aging, while line graph 4 shows the same for comparison capacitors after the aging process.

In FIG. 2, the line graph 5 denotes the impedance Z before aging and the graph 6 denotes the curve for the impedance after aging. These graphs relate to capacitors with the bismuth oxide additional coating. Graphs 7 and 8 which show the impedance values of capacitors without any additional coating before and after the aging process serve for comparison.

In both figures it is striking that the capacitors with the additional coating of bismuth oxide have electrical values with a very low spread. The electrical values show further improvement after the aging process, whereas the capacitors without the additional coating exhibit widely spread values for the dissipation factor and impedance, these values being even worse after aging.

EMBODIMENT 2

Tantalum solid electrolytic capacitors having the rated value 1.2 $\mu F/35V$ were made by a process in accordance with the invention. An additional coating of bixmuth oxide was produced by immersing the capacitor bodies in an acid p.5 M bixmuth nitrate bath having a pH value of about 0.3. The mean value for the impedance Z (10kHz) with these capacitors was 15.1 ohms as compared with 41.9 ohms for the same capacitors without the additional coating. The leakage current (measured 30 secs. after applying the voltage 1.1 $U_N$) was less than 0.01 $\mu A$.

EMBODIMENT 3

Tantalum solid electrolytic capacitors having a rated value 1.2 $\mu F/35V$ were made by a process in accordance with the invention. An additional coating in the form of a lead oxide coating was produced by immersion in a 0.5 M lead nitrate bath and subsequent pyrolysis. The mean value for the impedance Z (10 kHz) for these capacitors was 16.1 ohms as compared to 41.9 ohms for capacitors not having the additional coating.

These capacitors also exhibited leakage current of less than 0.01 μA.

Figure 3:
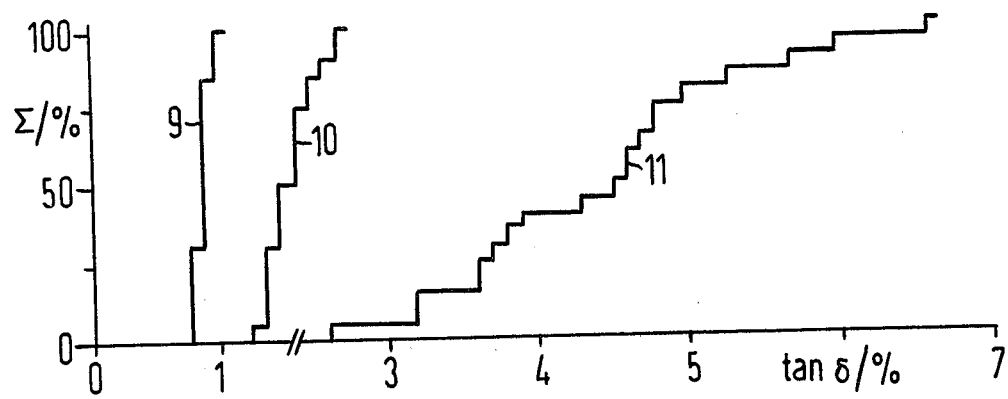
FIG. 3 is a graph also showing the cumulative frequency of the dissipation factor.

In FIG. 3, the cumulative frequency Σ for the loss dissipation factor tan δ (120 Hz, 25° C) is shown for the capacitors produced in accordance with Embodiments 2 and 3. Line graph 9 relates to the capacitors made in accordance with Embodiment 2 with an additional coating of bismuth oxide, and line graph 10 relates to those made in accordance with Embodiment 3 with an additional coating of lead oxide. For comparison, graph 11 shows the cumulative frequency for the dissipation factor tan δ for capacitors without any additional coating.

EMBODIMENTS 4 and 5

Tantalum solid electrolytic capacitors having rated value 10μF/35V were made by the process in accordance with the invention with an additional coating of zinc oxide or bismuth oxide. The additional coatings were made by immersing the capacitor bodies in a 0.5 M zinc nitrate or 0.5 M bismuth nitrate bath and subsequent pyrolysis.

In FIG. 4, the effect of the final forming time $t_e$ (125° C, 35 V) upon the dissipation factor tan δ (120 Hz, 25° C) is shown.

Graph 12 relates to capacitors with the additional coating of zinc oxide and graph 13 relates to those with the additional bismuth oxide coating. For comparison, graph 14 indicates values for capacitors made without any additional coating. Graph 15 shows the relationship for capacitors that have been made by the known process with separate intermediate forming stages.

I Claim:

1. A method for producing coatings on a solid electrolytic capacitor having a sintered anode made of a film-forming metal and provided with a dielectrically effective oxide coating, wherein the cathode is to be made of a semi-conductive metallic oxide with a graphite particle coating having a solderable metallic coating and an additional coating of a semi-conductive metallic oxide deposited in areas not covered by graphite particles comprising the steps of:

immersing a capacitor body having the sintered anode in a first bath containing a pyrolytically decomposable compound of the element needed for production of the cathode,
    while in said bath applying a first voltage to the capacitor body for a first given time interval,
    lowering said first voltage to a second voltage,
    removing the capacitor body from the bath and producing the cathode thereon by pyrolytic decomposition,
    applying the graphite particle coating,
    producing said additional coating by immersing in a second bath containing a pyrolytically decomposable compound of the element required for the additional coating,
    while in said second bath, applying a third voltage to the capacitor body for a second given time interval, and
    removing the capacitor body from the bath and producing said additional coating by pyrolytic decomposition.

2. A method in accordance with claim 1 wherein the steps of immersion in said baths and pyrolytic decomposition are repeated a plurality of times.

3. A method in accordance with claim 2, wherein the steps of immersion in the respective baths and pyrolytic decomposition are repeated between two and four times.

4. A method in accordance with claim 1, wherein said first bath comprises an acid manganese nitrate bath used to produce the cathode.

5. A method in accordance with claim 4, wherein the bath used to produce the cathode has a pH value less than or equal to unity.

6. A method in accordance with claim 5, wherein said first bath contains nitric acid as an acidifier.

7. A method in accordance with claim 1, wherein the second bath comprises a bismuth nitrate bath for producing said additional coating.

8. A process in accordance with claim 1, wherein the second bath comprises a lead nitrate bath for producing the additional coating.

9. A method in accordance with claim 1, wherein the second bath comprises a zinc nitrate bath used for producing the additional coating.

10. A method in accordance with claim 1, wherein the first and third voltages are higher than the rated capacitor voltage and lower than the anodizing voltage of the capacitor.

11. A method in accordance with claim 10, wherein the first voltage is greater than the third voltage.

12. A method in accordance with claim 1, wherein the third voltage is lowered to a fourth voltage after the lapse of a given time interval in said second bath.

13. A process in accordance with claim 12, wherein the second and fourth voltages are lower than the first and third voltages.

14. A method in accordance with claim 13, wherein the second voltage is greater than the fourth voltage.

15. A method in accordance with claim 1, wherein the voltage in the respective first and second baths are increased to the values of the first and third voltages at a rate of increase between 0.1 and 10 V/s.

16. A method in accordance with claim 15, wherein the rate of voltage increase set forth there in is 1 V/s.

17. A method in accordance with claim 13, wherein the lowering of the voltages from the first voltage to the second voltage and from the third voltage to the fourth voltage occurs at a rate in the range from 1 to 100 V/s.

18. A method in accordance with claim 17, wherein the rate at which said voltages are lower is 10 V/s.

19. A method in accordance with claim 12, wherein the times $t_1$, $t_2$, and $t_3$ lie in the range between 1 to 6 minutes.

20. A method in accordance with claim 19, wherein the times $t_1$, $t_2$, and $t_3$ are 3.5 minutes.

21. A method in accordance with claim 1, wherein the pyrolysis is carried out at a temperature in the range between 250° and 300° C.

22. A method in accordance with claim 1, wherein the individual steps to produce the cathode, graphite coating, additional coating and solderable metallic coating are completed in approximately equal length times.

23. A method in accordance with claim 22, wherein each of the aforesaid steps is completed in a time interval of 4 minutes.

* * * * *